US009784122B2

(12) United States Patent
Beaujard et al.

(10) Patent No.: US 9,784,122 B2
(45) Date of Patent: Oct. 10, 2017

(54) METHOD OF FABRICATING A COMPOSITE MATERIAL CASING FOR A GAS TURBINE ENGINE, AND A CASING OBTAINED THEREBY

(71) Applicants: SNECMA, Paris (FR); HERAKLES, Le Haillan (FR)

(72) Inventors: Antoine Jean-Philippe Beaujard, Moissy-Cramayel (FR); Elric Georges André Fremont, Merignac (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 283 days.

(21) Appl. No.: 14/427,199

(22) PCT Filed: Sep. 6, 2013

(86) PCT No.: PCT/FR2013/052061
§ 371 (c)(1),
(2) Date: Mar. 10, 2015

(87) PCT Pub. No.: WO2014/037675
PCT Pub. Date: Mar. 13, 2014

(65) Prior Publication Data
US 2015/0226084 A1    Aug. 13, 2015

(30) Foreign Application Priority Data

Sep. 10, 2012  (FR) .................................... 12 58449

(51) Int. Cl.
*F01D 25/24*    (2006.01)
*F01D 25/00*    (2006.01)
(Continued)

(52) U.S. Cl.
CPC ............ *F01D 25/005* (2013.01); *F01D 5/282* (2013.01); *F01D 9/042* (2013.01); *F01D 25/24* (2013.01);
(Continued)

(58) Field of Classification Search
CPC ........ F01D 25/005; F01D 5/282; F01D 9/042; F01D 25/24; F05D 2300/6033
(Continued)

(56) References Cited

U.S. PATENT DOCUMENTS 4,108,562 A  *  8/1978  Collard .................. F16B 9/023
                                                        403/254
4,643,636 A  *  2/1987  Libertini ................ F01D 5/284
                                                        415/138
(Continued)

FOREIGN PATENT DOCUMENTS

EP    1 764 481 A2    3/2007
EP    2 412 929 A1    2/2012
(Continued)

OTHER PUBLICATIONS

International Search Report as issued in International Patent Application No. PCT/FR2013/052061, dated Oct. 16, 2013.

*Primary Examiner* — Aaron R Eastman
(74) *Attorney, Agent, or Firm* — Pillsbury Winthrop Shaw Pittman LLP (57) ABSTRACT

A method of fabricating a composite material casing for a gas turbine engine, the method including making an outer shroud including a platform and a flange, making an inner shroud of smaller diameter than the outer shroud and including a platform and a flange, making a plurality of casing arms, each including a blade that is terminated at each radial end by a respective platform, arranging a plurality of openings in the respective platforms of the shrouds, each opening
(Continued)

serving to receive a platform of a casing arm, and assembling the casing arms with the outer shroud and with the inner shroud by inserting the platforms of the casing arms in the openings of the shrouds. A composite material casing is obtained by such a method.

18 Claims, 5 Drawing Sheets (51) Int. Cl.
*F01D 5/28* (2006.01)
*F01D 9/04* (2006.01)

(52) U.S. Cl.
CPC ..... *F05D 2300/6033* (2013.01); *Y02T 50/672* (2013.01); *Y02T 50/673* (2013.01); *Y10T 29/49323* (2015.01)

(58) Field of Classification Search
USPC ........................................................ 415/200
See application file for complete search history.

(56) References Cited

U.S. PATENT DOCUMENTS

| | | | | |
|---|---|---|---|---|
| 4,993,918 A * | 2/1991 | Myers | ................... | F01D 25/162 415/191 |
| 5,474,419 A * | 12/1995 | Reluzco | ................... | F01D 9/044 415/209.4 |
| 5,494,404 A * | 2/1996 | Furseth | ................... | F01D 9/042 415/209.3 |
| 5,586,864 A * | 12/1996 | Knorowski | ............. | F01D 9/044 415/209.2 |
| 6,547,518 B1 * | 4/2003 | Czachor | ................... | F01D 9/044 415/137 |
| 8,430,629 B2 * | 4/2013 | Turi | ........................ | F01D 9/044 415/189 |
| 2006/0010879 A1 * | 1/2006 | Aumont | ................... | F01D 9/023 60/796 |
| 2007/0154307 A1 * | 7/2007 | Cairo | ...................... | F01D 9/042 415/209.3 |
| 2008/0206046 A1 * | 8/2008 | Razzell | ................. | F01D 11/005 415/173.1 |
| 2011/0008154 A1 * | 1/2011 | Campbell | ............. | F01D 11/006 415/170.1 |
| 2011/0206522 A1 * | 8/2011 | Alvanos | ................... | F01D 5/282 416/204 R |
| 2011/0268561 A1 * | 11/2011 | Blanchard | ............... | F01D 5/282 415/174.4 |
| 2012/0009071 A1 * | 1/2012 | Tanahashi | ............... | F01D 5/282 416/241 B |

FOREIGN PATENT DOCUMENTS

| | | |
|---|---|---|
| FR | 2 981 602 | 4/2013 |
| FR | 2 983 519 A1 | 6/2013 |

* cited by examiner

METHOD OF FABRICATING A COMPOSITE MATERIAL CASING FOR A GAS TURBINE ENGINE, AND A CASING OBTAINED THEREBY

CROSS REFERENCE TO RELATED APPLICATIONS

This application is the U.S. National Stage of PCT/FR2013/052061 filed Sep. 6, 2013, which in turn claims priority to French Application No. 1258449, filed Sep. 10, 2012. The contents of both applications are incorporated herein by reference in their entirety.

BACKGROUND OF THE INVENTION

The present invention relates to casings, in particular exhaust casings, forming parts of gas turbine aeroengines, and in particular parts of turboprops or turbojets.

In a gas turbine aeroengine, the exhaust casing performs several functions. It performs a structural function by receiving a rear suspension enabling the engine to be fastened to the fuselage of the aircraft. It also performs an aerodynamic function by serving to guide the primary stream coming from the engine. Finally, it also performs a function of passing services so as to enable the various components of the engine to be fed with air and oil.

It is common practice for an exhaust casing to be made up of an inner shroud mounted around a bearing support, an outer shroud of diameter greater than the inner shroud and arranged coaxially around it, and a plurality of casing arms that extend radially between the shrouds and that are fastened thereto at their radial ends.

The outer shroud is for receiving the rear suspension via clevis-type fittings. The casing arms connecting the shrouds together serve in particular to guide the primary stream coming from the engine. Furthermore, some of the casing arms are hollow in order to pass ducts for conveying air and oil to components of the engine.

The exhaust casing of a gas turbine engine presents the main drawback of being a part that is relatively heavy, since it is made of metal, which is particularly penalizing in terms of the fuel consumption of the aircraft.

OBJECT AND SUMMARY OF THE INVENTION

There thus exists a need to be able to have a method of fabricating a casing for a gas turbine engine that makes it possible to obtain a casing that is lighter than a casing having a metal structure.

In accordance with the invention, this object is achieved by a method of fabricating a casing out of composite material for a gas turbine engine, the method comprising:

making an outer shroud out of composite material comprising an annular platform that is to define the outside of the flow passage for the gas stream passing through the casing and an annular flange that is to enable the casing to be fastened upstream to a turbine casing of the engine;

making an inner shroud out of composite material of smaller diameter than the outer shroud, the inner shroud comprising an annular platform for defining the inside of the flow passage for the gas stream passing through the casing, and an annular flange;

making a plurality of casing arms out of composite material, each arm comprising a blade that is terminated at each radial end by a respective platform;

providing a plurality of openings in the respective platforms of the shrouds, each opening being for receiving a platform of a casing arm; and assembling the casing arms with the outer shroud and the inner shroud by inserting the platforms of the casing arms in the openings in the shrouds.

Such a method makes it possible to obtain a composite material casing of weight that is considerably lighter than that of a metal casing (the density ratio between a composite material such as a ceramic matrix composite (CMC) material and a metal alloy is about 4). Furthermore, the method of the invention provides for assembly that is simplified since there are only three independent subassemblies, namely one subassembly for the outer shroud, another subassembly for the inner shroud, and a subassembly made up of the casing arms.

Preferably, each shroud is made from a fiber preform obtained by winding a plurality of superposed layers of a fiber texture onto a mandrel, the fiber preform being densified with a matrix.

Also preferably, each casing arm is made from a fiber blank obtained by three-dimensional weaving while leaving two zones of non-interlinking in the thickness of the fiber blank, one at each end thereof, the fiber blank being shaped by folding out the non-interlinked portions so as to form a fiber preform having a preform portion that corresponds to the blade of the casing arm made integrally with two preform portions, each corresponding to a respective platform of the casing arm, the resulting fiber preform being densified with a matrix.

Under such circumstances, a connection zone between the non-interlinked portions and the interlinked portions of the fiber blank may be filled in with a ceramic fiber felt prior to densifying the fiber preform.

The casing arms may be held assembled with an outer shroud and with an inner shroud by brazing, by co-densification, or by mechanical connection of their respective platforms in the openings of the shrouds.

Also preferably, the casing arms are initially assembled to one of the shrouds by inserting their respective platforms radially into the openings of the shroud, and then the other shroud is assembled on the resulting preassembly by causing the opposite platforms of the casing arms to slide in the corresponding openings of the other shroud.

The invention also provides a composite material casing for a gas turbine engine, the casing comprising an outer shroud comprising an annular platform for defining the outside of the flow passage for the gas stream passing through the casing and an annular flange for enabling the casing to be fastened upstream to a turbine casing of the engine, an inner shroud of smaller diameter than the outer shroud and comprising an annular platform for defining the inside of the flow passage for the gas stream passing through the casing, and an inner flange, and a plurality of casing arms, each comprising a blade that is terminated at each radial end by a respective platform, the platforms of the casing arms being assembled to the respective platforms of the shrouds.

Preferably, each shroud platform has a plurality of openings into which the platforms of the casing arms are inserted. The openings in at least one of the shrouds may open out to an axial end of the corresponding platform.

The flange of the outer shroud may have an upstream shoulder for fastening the casing upstream to the turbine casing, and a downstream shoulder for fastening the casing downstream to an engine nozzle. Alternatively, the flange of the outer shroud may extend axially downstream beyond trailing edges of the casing arms in order to form the engine nozzle.

Likewise, the flange of the inner shroud may have an upstream shoulder for fastening the casing upstream to a closure cover, and a downstream shoulder for fastening the casing downstream to a central body of the engine. Alternatively, the flange of the inner shroud may extend axially downstream beyond trailing edges of the casing arms in order to form a central body of the engine.

The blade of at least one of the casing arms may be hollow so as to enable services of the engine to pass therethrough, such as ducts for feeding various components of the engine with air and oil.

Preferably, the shrouds and the casing arms are made of ceramic matrix composite material.

Also preferably, the casing forms a single piece. The casing may constitute an exhaust casing.

The invention also provides a gas turbine aeroengine including a casing as defined above.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

The invention is described below in the context of its application to fabricating a non-structural turbojet exhaust casing.

More generally, the invention applies to fabricating any part or casing having an outer shroud and an inner shroud connected together by a plurality of casing arms.

Figure 1:
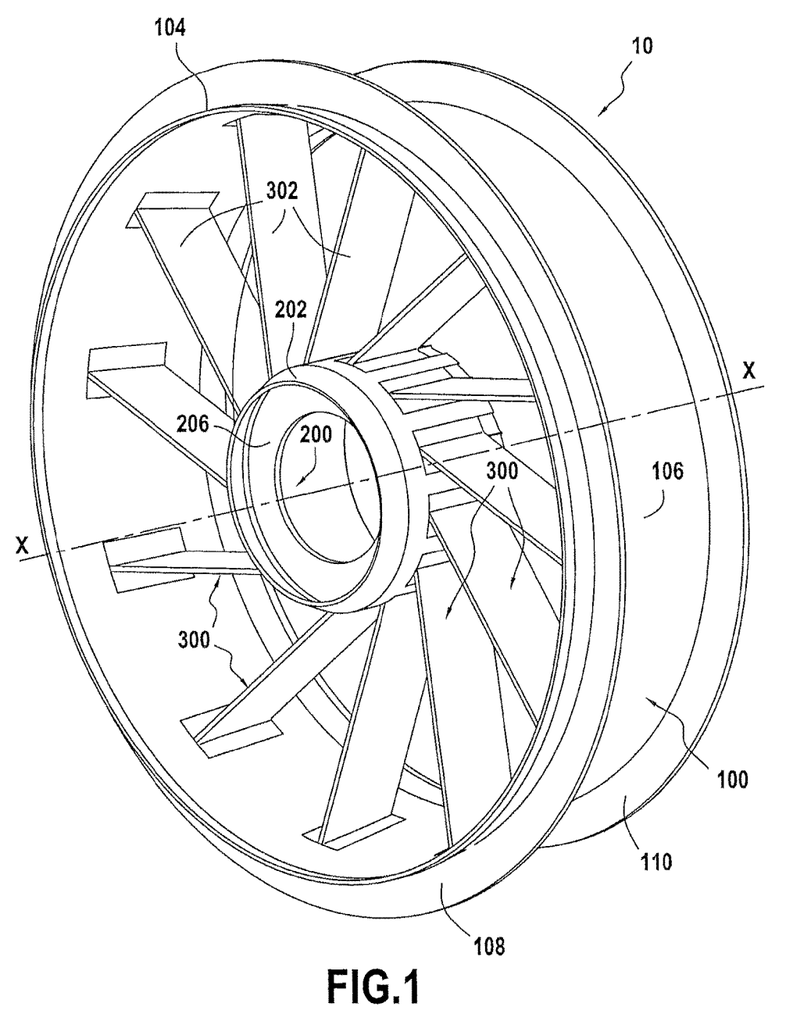
FIG. 1 is a diagrammatic view in perspective of an exhaust casing of a gas turbine aeroengine.

One such exhaust casing 10 is shown diagrammatically in FIG. 1. In known manner, it comprises in particular an axisymmetric outer shroud 100 centered on a longitudinal axis X-X of the turbojet, an axisymmetric inner shroud 200 of smaller diameter than the outer shroud and arranged coaxially therein, and a plurality of casing arms 300 radially connecting together the shrouds 100 and 200.

In the description below, terms such as "inner" and "outer" are defined relative to the longitudinal axis X-X of the turbojet.

Figure 2:
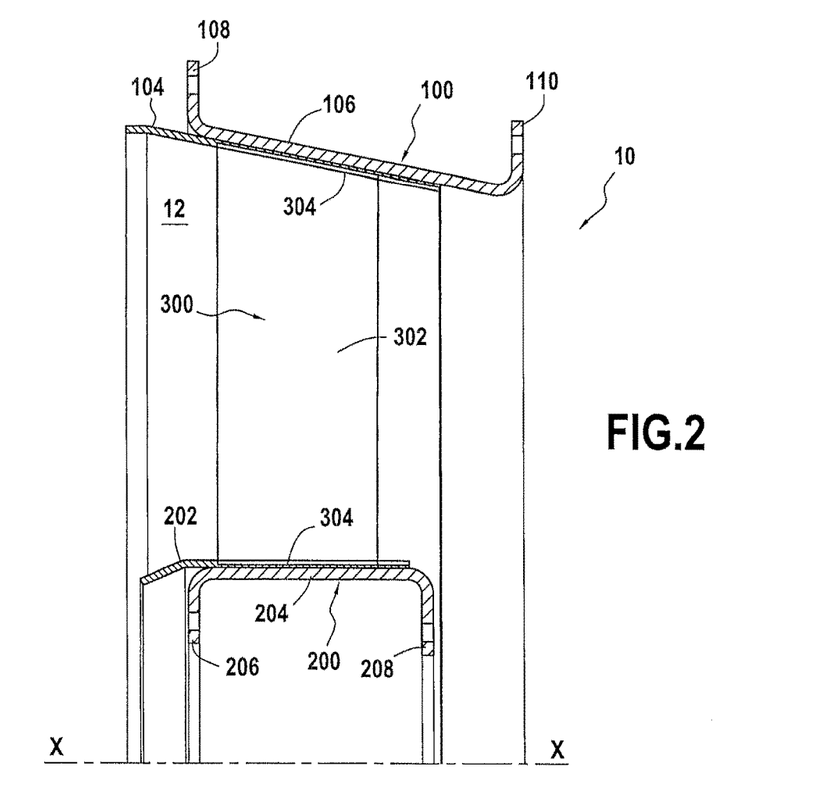
FIG. 2 is a radial section view of FIG. 1.

As shown more particularly in FIG. 2, the outer shroud 100 comprises an annular platform 104 situated on the inside and serving in particular to define the outside of the flow passage 12 for the gas stream passing through the exhaust casing. On its outside, the outer shroud has an annular flange 106, this flange has an upstream shoulder 108 for fastening the exhaust casing upstream to a turbine casing of the engine (not shown), and a downstream shoulder 110 for enabling a nozzle of the engine (not shown) to be fastened downstream from the exhaust casing.

The inner shroud 200 comprises an annular platform 202 situated on the outside that is intended in particular to define the inside of the flow passage 12 for the gas stream passing through the exhaust casing. On the inside, the inner shroud comprises an annular flange 204, the flange having an upstream shoulder 206 for fastening the exhaust casing upstream to a cover closing the enclosures of the low pressure turbine of the turbojet, and a downstream shoulder 208 for fastening a central body or "plug" of the engine to the downstream end of the exhaust casing. When the inner shroud is mounted around a bearing support of the low pressure turbine, the upstream shoulder of its annular flange may be designed to be connected to said bearing.

The outer and inner shrouds 100 and 200 are made of composite material, preferably out of ceramic matrix composite (CMC) material. For this purpose, each of the shrouds may be made from a fiber preform obtained either by winding a plurality of superposed layers of fiber texture onto a mandrel, or by winding fibers, with the fiber preform as obtained in this way subsequently being densified with a matrix.

The respective platforms and flanges of the shrouds are preferably made as a single piece. For example, the platform and the flange of a shroud may be obtained from a single fiber preform (by creating non-interlinking within its thickness at each of its axial ends in order to obtain a preform with a preform portion corresponding to the platform that is formed integrally with a preform portion corresponding to the flange). Alternatively, the platform and the flange of a shroud can be made from two different fiber preforms that are wound onto a common mandrel and possibly bonded together by needling.

The casing arms 300 are regularly distributed around the longitudinal axis X-X of the turbojet, and by way of example there may be 16 of them. Each of them comprises a blade 302 (which may be solid or hollow if it is necessary to have air or oil flow ducts passing therethrough), each blade terminating at each of its radial ends in a platform 304 (see FIG. 3).

Figure 3:
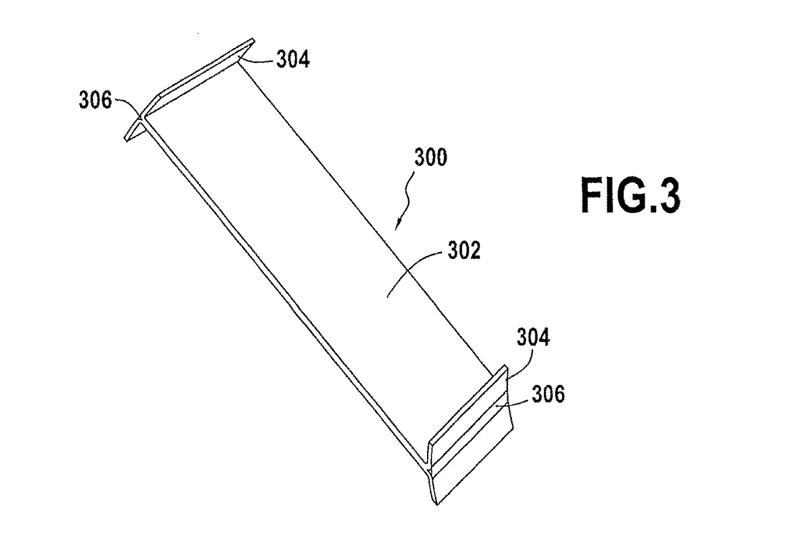
FIGS. 3 to 6 show various steps in fabricating an exhaust casing in accordance with the invention.

The casing arms 300 are also made of composite material, preferably of CMC material. For this purpose, each casing arm may be made from a fiber blank obtained by three-dimensional weaving while leaving two zones of non-interlinking within the thickness of the fiber blank at each of its ends. The fiber blank is then shaped by folding out the non-interlinked portions so as to form a fiber preform with a preform portion corresponding to the blade of the casing arm formed integrally with two preform portions, each corresponding to one of the platforms of the casing arm. The fiber preform as obtained in this way is subsequently densified with a matrix.

It should be observed that the connection zone between the non-interlinked portions and the interlinked portions of the fiber blank from which the arms of the casing are made may be filled in with a felt 306, e.g. made of SiC type ceramic fibers, prior to densifying the fiber preform.

In order to make solid blade casing arms, it is possible for example to draw on the content of French patent application No. 11/59668 filed on Nov. 25, 2011 together by Snecma and Herakles, which application describes using composite material to make single-blade vane sets for a turbine nozzle or for compressor guide vanes. Likewise, when making hollow-blade casing arms, it is possible to refer to French patent application No. 11/03661 filed on Dec. 1, 2011 jointly by Snecma and Herakles, which application describes making hollow-blade turbine vanes out of composite material. The contents of those applications are incorporated herein by way of reference.

The casing arms 300 as made in this way are assembled to the shrouds 100, 200 in order to form an exhaust casing as described below.

Figure 4:
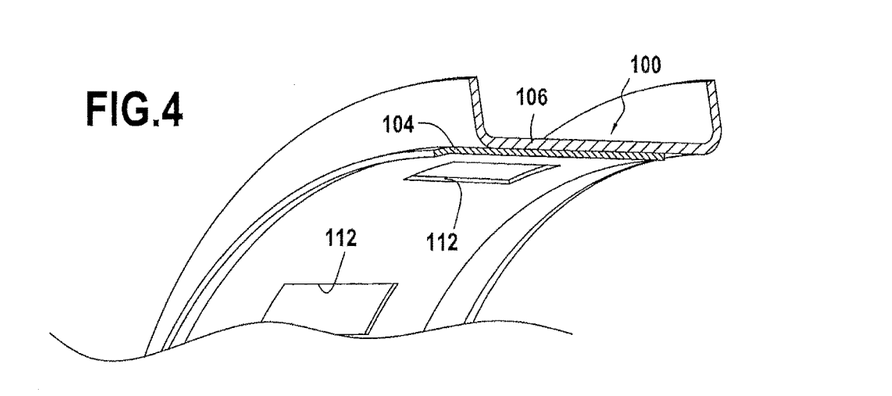

As shown in FIG. 4, openings 112 are arranged in the platform 104 of the outer shroud 100. Each of these openings 112 is for receiving the platform 304 of a casing arm 300.

Figure 6:
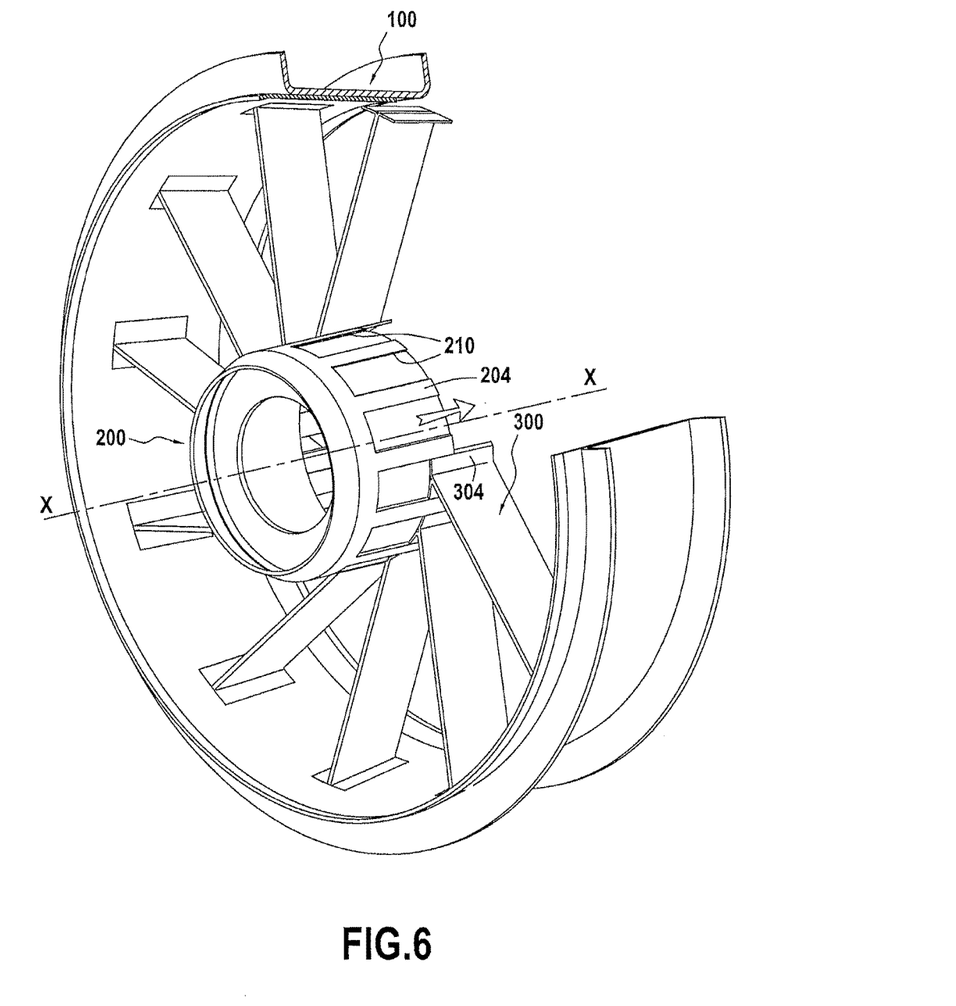

In similar manner, openings 210 are also formed in the platform 204 of the inner shroud 200 in order to receive the opposite platforms of the casing arms (see FIG. 6).

These openings 112, 210 are complementary in shape to the platforms 304 of the casing arms that they are to receive and they present a depth that corresponds substantially to the thickness of the platforms. Furthermore, they may be made by machining the corresponding platform after it has been densified.

Figure 5:
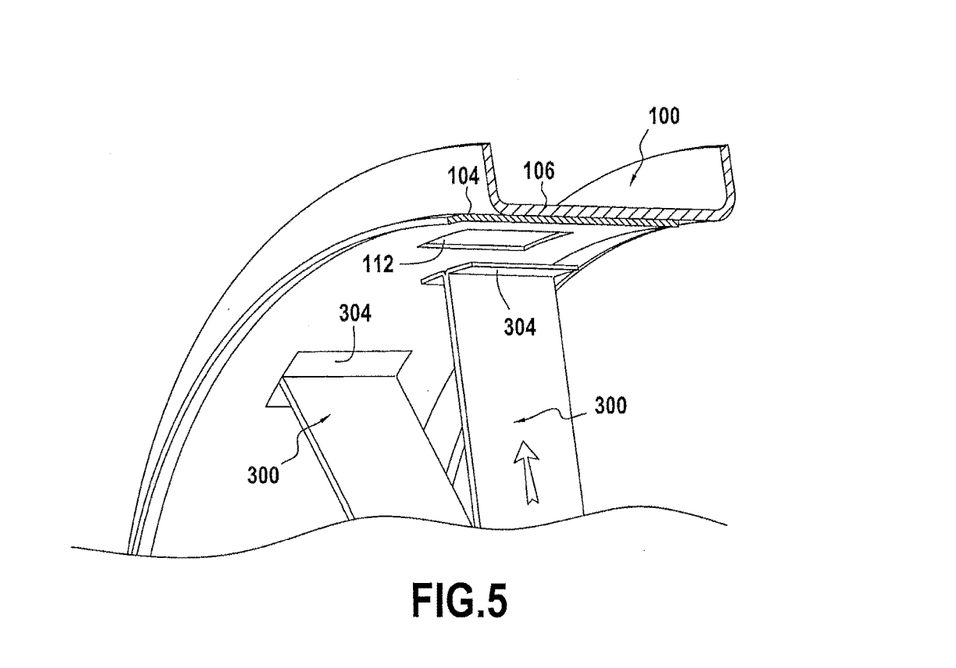

Once the openings 112, 210 have been machined in the platforms of the shrouds, the casing arms 300 are assembled therein. In the example shown, the casing arms are initially assembled with the outer shroud 100 by inserting their respective platforms 304 radially into the openings 112 of the outer shroud (FIG. 5). The casing arms are held in this position, and then the inner shroud 200 is mounted on the above preassembly by causing the opposite platforms of the facing arms to slide in the corresponding openings 210 in the inner shroud (FIG. 6). The casing arms are then held assembled to both of the shrouds by brazing, by co-densification, or by mechanical bonding (of the type using flat-headed screws) between their respective platforms and the openings in the shrouds.

It should be observed that assembling the casing arms in this way requires the openings 210 of the inner shroud 200 to open out to one of the axial ends of the corresponding platform (specifically in this example the downstream end).

Naturally, it is possible to envisage assembly being performed in the opposite direction, beginning with the casing arms being assembled to the exhaust casing shrouds initially by assembling the casing arms with the inner shroud prior to engaging the outer shroud. Under such circumstances, it is the openings in the outer shroud that need to open out into an axial end of the corresponding platform.

An exhaust casing 10 is thus obtained that is made of composite material, like the casing shown in FIG. 1. This exhaust casing presents the feature of forming a single part, i.e. it is made integrally with its shrouds and its casing arms.

Figure 7:
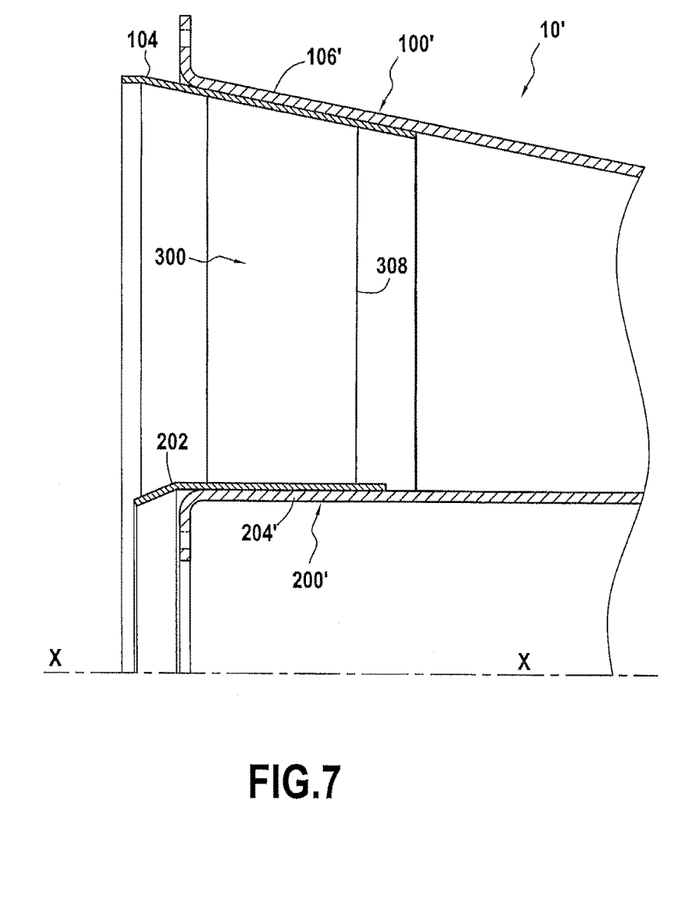
FIG. 7 is a radial section view of an exhaust casing in a variant embodiment of the invention.

In a variant embodiment shown in FIG. 7, the exhaust casing 10' made of composite material may present shape arrangements in the respective flanges of its shrouds.

In particular, in this variant embodiment, the flange 106' of the outer shroud 100' extends axially downstream beyond a trailing edges 308 of the casing arms 300 in order to form the engine nozzle. Likewise, the flange 204' of the inner shroud 200' extends axially downstream beyond the trailing edges 308 of the casing arms 300 to form the central body of the engine. These flanges are otherwise made in similar manner to the flanges of the above-described exhaust casing shrouds.

As a result, the respective flanges of the shrouds enable the profiles of the nozzle and of the plug of the engine to be built up. This achieves a large saving in weight by avoiding the presence of shoulders and bolts for fastening those elements of the engine to the exhaust casing. This also results in a saving in time during production since these three elements of the engine (exhaust casing, nozzle, and plug) are made as a single piece.

The invention claimed is:

1. A method of fabricating a casing out of composite material for a gas turbine engine, the method consisting of:
    making an outer shroud out of composite material comprising an annular platform that is to define an outside of a flow passage for a gas stream passing through the casing and an annular flange that is to enable the casing to be fastened upstream to a turbine casing of the engine;
    making an inner shroud out of composite material of smaller diameter than the outer shroud, the inner shroud comprising an annular platform for defining an inside of the flow passage for the gas stream passing through the casing, and an annular flange;
    making a plurality of casing arms out of composite material, each arm comprising a blade that is terminated at each radial end by a respective platform;
    providing a plurality of openings in the respective platforms of the inner and outer shrouds, each opening being for receiving a platform of a casing arm and wherein each opening is not a through opening; and
    assembling the casing arms, the outer shroud, and the inner shroud, by inserting the platforms of the casing arms in the openings in the inner and outer shrouds.

2. A method according to claim 1, wherein each shroud is made from a fiber preform obtained by winding a plurality of superposed layers of a fiber texture onto a mandrel, the fiber preform being densified with a matrix.

3. A method according to claim 1, wherein each casing arm is made from a fiber blank obtained by three-dimensional weaving, while leaving two non-interlinked portions in a thickness of the fiber blank, one at each end thereof, the fiber blank being shaped by folding out the non-interlinked portions so as to form a fiber preform having a preform portion that corresponds to the blade of the casing arm made integrally with two preform portions, each corresponding to a respective platform of the casing arm, the resulting fiber preform being densified with a matrix.

4. A method according to claim 3, wherein a connection zone between the non-interlinked portions and interlinked portions of the fiber blank is filled in with a ceramic fiber felt prior to densifying the fiber preform.

5. A method according to claim 1, wherein the casing arms are held assembled with the outer shroud and with the inner shroud by brazing, by co-densification, or by mechanical connection of their respective platforms in the openings of the shrouds.

6. A method according to claim 1, wherein the casing arms are initially assembled to one of the inner and outer shrouds by inserting their respective platforms radially into the openings of the one of the inner and outer shrouds, and then the other one of the inner and outer shrouds is assembled on a-resulting preassembly by causing opposite platforms of the casing arms to slide in the corresponding openings of the other one of the inner and outer shrouds.

7. A composite material casing for a gas turbine engine, the casing consisting of:
    an outer shroud comprising an annular platform for defining an outside of a flow passage for a gas stream passing through the casing and an annular flange for enabling the casing to be fastened upstream to a turbine casing of the engine;
    an inner shroud of smaller diameter than the outer shroud and comprising an annular platform for defining an inside of the flow passage for the gas stream passing through the casing, and an inner flange; and
    a plurality of casing arms, each comprising a blade that is terminated at each radial end by a respective platform, the platforms of the casing arms being assembled to the respective platforms of the inner and outer shrouds.

8. A casing according to claim 7, wherein each annular platform of the inner and outer shrouds has a plurality of openings into which the platforms of the casing arms are inserted, wherein each opening is not a through opening.

9. A casing according to claim 8, wherein the openings in at least one of the inner and outer shrouds open out to an axial end of the corresponding platform.

10. A casing according to claim 7, wherein the flange of the outer shroud has an upstream shoulder for fastening the casing upstream to the turbine casing, and a downstream shoulder for fastening the casing downstream to an engine nozzle.

11. A casing according to claim 7, wherein the flange of the outer shroud extends axially downstream beyond trailing edges of the casing arms in order to form an engine nozzle.

12. A casing according to claim 7, wherein the flange of the inner shroud has an upstream shoulder for fastening the casing upstream to a closure cover, and a downstream shoulder for fastening the casing downstream to a central body of the engine.

13. A casing according to claim 7, wherein the flange of the inner shroud extends axially downstream beyond trailing edges of the casing arms in order to form a central body of the engine.

14. A casing according to claim 7, wherein the blade of at least one casing arm is hollow.

15. A casing according to claim 7, wherein the shrouds and the casing arms are made of ceramic matrix composite material.

16. A casing according to claim 7, wherein the casing forms a single piece.

17. A casing according to claim 7, wherein the casing constitutes an exhaust casing.

18. A gas turbine aeroengine including a casing according to claim 7.

* * * * *